United States Patent [19]

Abert et al.

[11] Patent Number: 5,761,451
[45] Date of Patent: Jun. 2, 1998

[54] CONFIGURATION WITH SEVERAL ACTIVE AND PASSIVE BUS USERS

[75] Inventors: Michael Abert, Au; Siegfried Block, Kandel; Johannes Bozenhardt; Franz Leigsnering, both of Ettlingen; Werner Pfatteicher, Pfinztal; Franz-Clemens Schewe, Karlsruhe, all of Germany

[73] Assignee: Siemens Aktiengesellschaft, Germany

[21] Appl. No.: 433,397

[22] PCT Filed: Oct. 29, 1993

[86] PCT No.: PCT/DE93/01042

§ 371 Date: May 4, 1995

§ 102(e) Date: May 4, 1995

[87] PCT Pub. No.: WO94/10632

PCT Pub. Date: May 11, 1994

[30] Foreign Application Priority Data

Nov. 4, 1992 [DE] Germany ............ 42 37 259.3
Feb. 12, 1993 [DE] Germany ............ 43 04 259.7

[51] Int. Cl.$^6$ .......................... H01J 13/00
[52] U.S. Cl. .............. 395/293; 395/287; 395/290; 711/147
[58] Field of Search .................. 395/290, 293, 395/306, 287, 300, 308, 311, 497.01, 425, 479, 481, 484, 490, 494, 482, 474, 475, 477; 711/147, 148, 150, 153

[56] References Cited

U.S. PATENT DOCUMENTS

| | | | |
|---|---|---|---|
| 5,179,713 | 1/1993 | Catlin et al. | 395/800 |
| 5,249,297 | 9/1993 | Brockmann et al. | 395/733 |
| 5,274,787 | 12/1993 | Hirano et al. | 395/425 |
| 5,295,259 | 3/1994 | Horne | 395/575 |
| 5,345,562 | 9/1994 | Chen | 395/821 |
| 5,367,678 | 11/1994 | Lee et al. | 395/650 |
| 5,377,334 | 12/1994 | Boldt et al. | 395/290 |
| 5,404,327 | 4/1995 | Houston | 395/481 |
| 5,432,911 | 7/1995 | Mura et al. | 395/275 |
| 5,475,850 | 12/1995 | Kahn | 395/290 |

FOREIGN PATENT DOCUMENTS

| | | |
|---|---|---|
| 0 206 321 | 12/1986 | European Pat. Off. |
| 0 250 698 | 1/1988 | European Pat. Off. |
| 42 19 005 A1 | 12/1993 | Germany |
| 2 109 968 | 6/1983 | United Kingdom |

*Primary Examiner*—Jack B. Harvey
*Assistant Examiner*—Raymond N Phan
*Attorney, Agent, or Firm*—Kenyon & Kenyon

[57] ABSTRACT

A system having several active (master) and passive (slave) bus users (processors), each of which is allocated a memory with its own memory area. Each bus user has read access to its own memory area and each active (master) bus user has write access to every memory area. A control line is provided for sending a control signal which indicates to the active (master) bus users accessing the memory areas whether data have already been written into the memory areas. The control signal has dominant and recessive states. Outside of the access cycles, all bus users generate a dominant state. During a cycle of access to memory areas, only the bus users in whose memory areas the data have not yet been written, generate such a signal. The system may be used in automation systems.

10 Claims, 2 Drawing Sheets

1 …

CONFIGURATION WITH SEVERAL ACTIVE AND PASSIVE BUS USERS

BACKGROUND OF THE INVENTION

The present invention concerns a configuration (or system) with several active (master) and passive (slave) bus users, each of which includes an allocated memory.

To allow hardware and software tasks to be performed simultaneously in the entire system, each memory in such a configuration has a shared memory area. A "memory area" is, for example, a data memory (RAM) or register of the bus users to which each active bus user has read or write access. The contents of the memory area of each bus user must be identical, and changes in the contents must occur synchronously, taking into account the different propagation times in the system.

German Patent Application No. P 42 19 005.3 proposes a computer system with a plurality of interconnected processors, each of which is allocated a memory. The memories have at least one common memory area accessed by the processors. The common memory area is used for initiating a change of state of the processors or for a synchronous processing of processor tasks. The computer system of the 42 19 005.3 application does not refer to the type of configuration of the present invention.

The goal of the present invention is to provide a configuration according to the above mentioned type, in which the contents of the memory area is changed quasi-synchronously.

SUMMARY OF THE INVENTION

To achieve this goal, the present invention provides a novel configuration having at least one active bus user with an allocated memory having a memory area, at least one passive bus user with an allocated memory having a memory area, a system bus, an arbiter, and a control line. The system bus couples the active user(s) and the passive user(s) with address, data, and control lines. The arbiter manages access to the system bus. Each of the bus users can read access its own memory area. Each of the active bus users can write access each memory area. The control line transfers a control signal which indicates to an active user attempting to access a memory area that data is being written into memory areas. The control signal has a dominant state and a recessive state. All bus users generate a dominant state outside an access cycle, while during an access cycle to memory areas, only bus users having memory areas in which the data has not yet been written generate a dominant state.

In a preferred embodiment of the present invention, the passive bus user generates a dominant state of the control signal during a read access by it.

In a preferred embodiment of the present invention, the arbiter blocks access to the system bus by other bus users before a read or write access by the active bus user.

In a preferred embodiment of the present invention, the bus users may be modules in one or more subracks. In this embodiment, the control line preferably runs through all of the subracks.

The system of the present invention may also include modules that cannot generate control signals. Such modules should include an adaptor device for generating a control signal assuming a recessive state and having a delay equal to at least a longest duration of an access cycle.

The control line may be provided with a pull-up resistor. The bus users may be coupled with the control line via an open collector output.

The configuration according to the present invention can be used, in particular, in a memory-programmable control, and preferably in a memory-programmable control with a central device and at least one extension device, connected, via a system bus and a connection cable, with the control line.

BRIEF DESCRIPTION OF THE DRAWING

The present invention, as well as its implementation and advantages, are described in detail using the drawing that illustrates an embodiment of the present invention.

DETAILED DESCRIPTION

Figure 1:
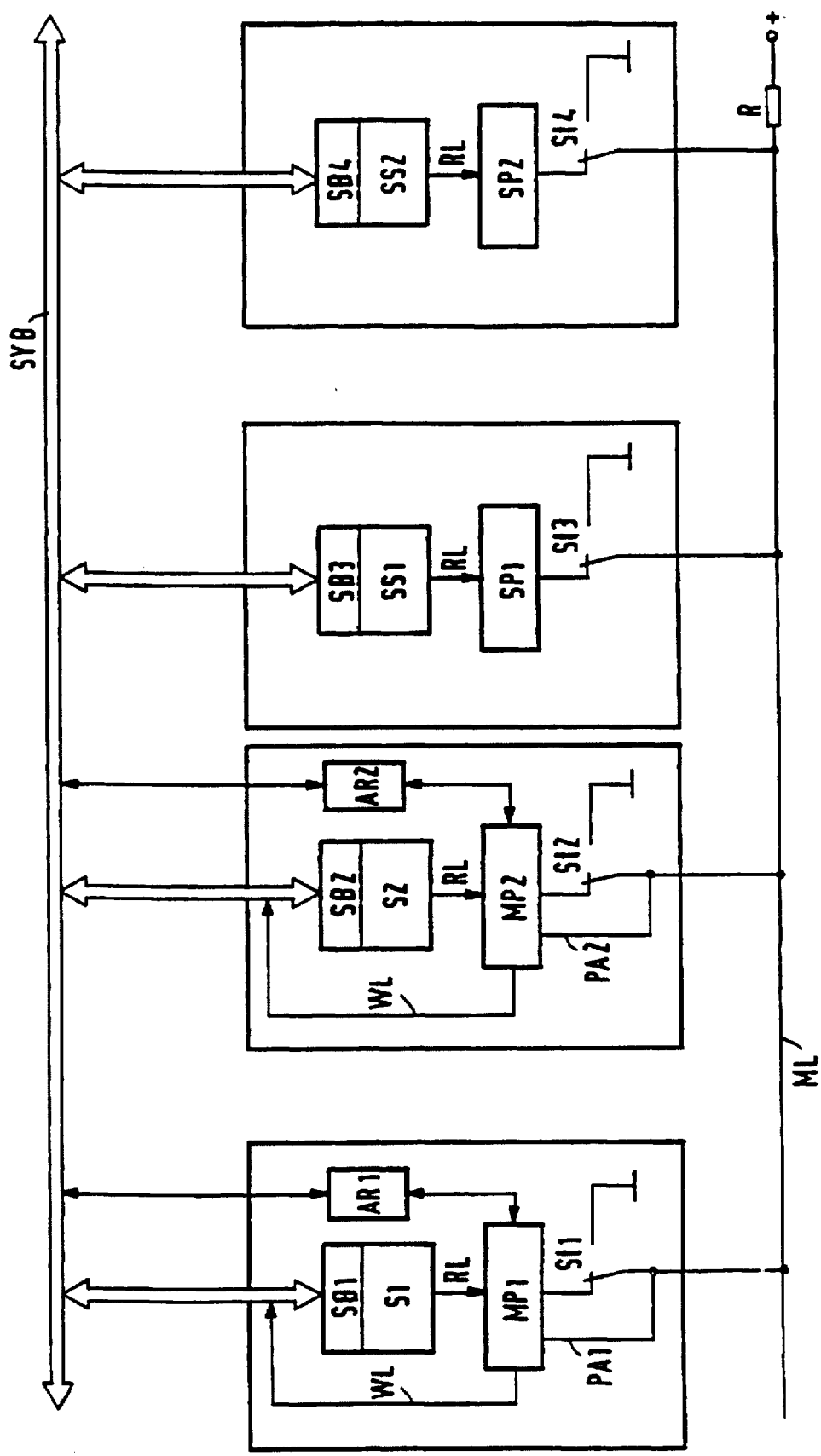
FIG. 1 is a block diagram illustrating a configuration according to the present invention.

In FIG. 1, active and passive bus users are coupled with each other, via a system bus SYB having parallel address, data, and control lines, in the form of master and slave processors. The master processors are denoted with MP1, MP2, and the slave processors are denoted with SP1, SP2. Memories S1, S2, SS1 and SS2 are allocated to the processors MP1, MP2, SP1 and SP2, respectively. Each one of memories S1, S2, SS1, and SS2 has a memory area SB1, SB2, SB3, and SB4, respectively. Each processor MP1, MP2, SP1, and SP2 has access to read from its own memory area SB1, SB2, SB3, and SB4, respectively, and each master processor MP1, MP2 has access to write to each of the memory areas SB1, SB2, SB3, and SB4. For this purpose, each of the master processors MP1, MP2 have a read line RL and a write line WL for the transfer of a read and write signals, respectively. The slave processors have only a read line RL. Write line WL runs, via system bus SYB, to the memory areas of all processors MP1, MP2, SP1, SP2.

Master processors MP1 and MP2 are also provided with arbiters AR1 and AR2, respectively, which are responsible for managing the system bus SYB, processing bus requests from the master processors, deciding bus assignments and locking the system bus SYB against master processors without access authorization.

A control line ML is coupled with master processors MP1 and MP2 via level scan lines PA1 and PA2, respectively, and with a grounding line via switches St1, St2, St3, and St4, controlled by processors MP1, MP2, SP1, and SP2, respectively. The control line ML is brought up to high level via a pull-up resistor R. The level on control line ML serves as a control signal SR (System Ready, see FIG. 2), which is read by the master processor. In an idle state (during which switches St1, . . . are connected to the grounding line) the control signal SR is switched to a low level. Therefore, this low level can be called the dominant state of control line ML, since it is superimposed to the high level, which is the recessive state. The dominant low state remains in effect until all switches St1, St2, St3, and St4 are opened.

Figure 2:
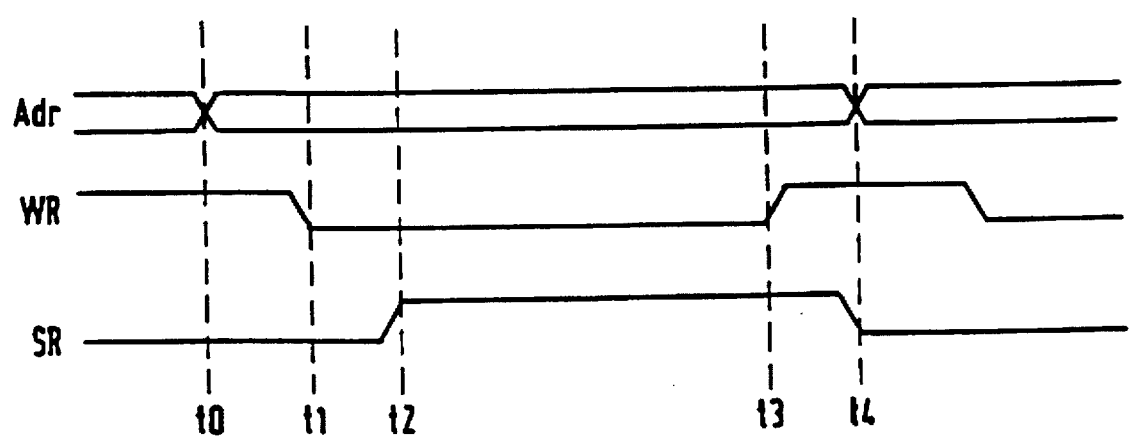
FIG. 2 is a timing diagram of the relevant control signals of the present invention.

FIG. 2 is a timing diagram illustrating a write signal WR, the control signal SR and an address signal Adr. It is assumed that master processor MP1 write accesses memory areas SB1, SB2, SB3, SB4 between time t0 and time t4 to write new data into these memory areas SB1, SB2, SB3, SB4. For this purpose, at time t0, the master processor MP1 addresses its own memory area SB1 and memory areas SB2, SB3, and SB4 of processors MP2, SP1, and SP2, respectively, and activates write signal WR from time t1 to time t3. Outside of the write access time, i.e., before t0 and after t4, switches St1, St2, St3, and St4 are closed, and the dominant low state is entered. This low state is preserved until the new data are written into memory areas SB1, SB2, SB3, and SB4 of all processors during the write access. Processors MP1, MP2, SP1, SP2 report this to master processor MP1 via control signal SR by opening their switches St1, St2, St3, St4 after the data is written to their memory areas. When all the processors have opened their switches, control signal SR is de-activated and enters the recessive high level which is read by the master processor via control line ML and level scan line PA1. In the present example, this occurs at time t2. Control signal SR remains in the recessive high state until the write access ends at time t4.

Thus, the control signal SR is generated by processors MP1, MP2, SP1, SP2 according to the following scheme:

1. If no write access to memory areas SB1, SB2, SB3, SB4 occurs, then each processor MP1, MP2, SP1, SP2 activates control signal SR (which assumes a dominant low state), by closing switches St1, St2, St3, St4.
2. Processors MP1, MP2, SP1, SP2, in whose memory areas SB1, SB2, SB3, SB4 new data is written, deactivate control signal SR (which assumes a recessive high state), by opening (all) switches St1, St2, St3, St4.

To prevent a master processor MP1, MP2 from write accessing memory areas SB1, SB2, SB3, SB4 during a read access of another master processor MP2, MP1 to its memory area SB1, SB2, the master processors MP1, MP2 are arbitrated before both a write access and a read access. Thus a master processor is not interfered with by other master processors during a "read-modify-write" access. Therefore, "telescoping" access by several master processors MP1, MP2 is not possible.

A slave processor SP1, SP2 also refuses to acknowledge an attempted (requested) write access by a master processor MP1, MP2 (i.e., slave processors SP1, SP2 activate control signal SR (dominant state)) if slave processors SP1, SP2 are reading from their memory areas. Write access by the master processor MP1, MP2 is not permitted until slave processors SP1, SP2 have completed their internal read operations.

To connect processors not equipped with a control line ML for the control signal SR, an adaptation device can be introduced between each such processor and the system bus SYB. The adaptation device generates control signal SR via a timer, whose operating time must exceed the longest duration of an access cycle. The generated control signal is interrupted as soon as the adaptation device detects a high level of control signal SR. If such a processor is taken from the adaptation device and an access takes place, the access can only be interrupted after the timer operating time has elapsed. The adaptation device ensures compatibility of the new configuration of the present invention with previously available processors.

Interface modules, used to link a central device to expansion devices, hold control signal SR, in an access to processors in an expansion device, at low level until the farthest removed unit has received the write signal in its link lines and transmitted its control signal SR to the central device. The time required therefor corresponds to twice the maximum signal transmission time in the link line. The interface module obtains this time information from its individual line timing or from information regarding the cable length between the respective processors.

We claim:

1. A system comprising:
   (a) at least one active bus device;
   (b) at least one passive bus device;
   (c) a system bus coupling the active bus device and the passive bus device with address, data, and control lines;
   (d) an arbiter for managing access to the system bus;
   (e) a first memory allocated to the active bus device and a second memory allocated to the passive bus device, each memory having a memory area, wherein each of the at least one passive bus device and the at least one active bus device has read access to its own memory area and wherein the active bus device has write access to each memory area; and
   (f) a control line for transferring a control signal which indicates to the active bus device accessing the memory areas, that data are being written into the memory areas, wherein the control signal has a dominant state and a recessive state, and
   wherein the at least one active and passive bus devices generate the dominant state outside an access cycle, and wherein only bus devices having memory areas in which the data has not yet been written generate the dominant state during the access cycle to the memory areas.

2. The system of claim 1, wherein the passive bus device generates the dominant state of the control signal during a read access of the passive bus device to its memory area.

3. The system of claim 1, wherein the arbiter blocks access to the system bus by further bus devices before a read access or a write access is executed by the active bus device.

4. The system of claim 1 wherein the active and passive bus devices are modules in a subrack.

5. The system of claim 1 wherein the active and passive bud devices are modules in a plurality of subracks and the control line runs through all of the subracks.

6. The system of claim 1, wherein the control line includes a pull-up resistor, and wherein at least one of the active and passive bus devices are coupled to the control line with an open collector output.

7. The system of claim 4, further comprising: processors that cannot generate the control signal, each of the processors including a corresponding adaption device for generating the control signal which generates the recessive state with a delay equal to at least a longest duration of the access cycle, each of the processors coupled with the system bus using the corresponding adaptation device.

8. A memory programmable control comprising:
   (a) at least one active bus device;
   (b) at least one passive bus device;
   (c) a system bus coupling the active bus device and the passive bus device with address, data, and control lines;
   (d) an arbiter for managing access to the system bus;
   (e) a first memory allocated to the active bus device and a second memory allocated to the passive bus device, each memory having a memory area, wherein each of the at least one passive bus device and the at least one active bus device has read access to its own memory area and wherein the active bus device has write access to each memory area; and
   (f) a control line for transferring a control signal which indicates to the active bus device accessing the memory areas, that data are being written into the memory areas, wherein the control signal has a dominant state and a recessive state, and
   wherein the at least one active and passive bus devices generate the dominant state outside an access cycle, and wherein only bus devices having memory areas in which the data has not yet been written generate the dominant state during the access cycle to the memory areas.

9. The memory programmable control of claim 8 further including a central unit and at least one expansion device, which are connected with a connecting cable consisting of the system bus and a control line.

10. A bus device for accessing memory areas and generating a control signal having a dominant state and a recessive state, the bus device comprising:

a control unit generating a control signal, wherein the control signal is in the dominant state outside an access cycle, wherein the control signal is in the dominant state during the access cycle if data have not yet been written into the memory areas, and wherein, after the data have been written into the memory areas, the control signal is maintained in the recessive state during the access cycle to indicate to another bus device accessing the memory areas that the data have been written into the memory areas.

\* \* \* \* \*